Nov. 5, 1968  D. E. MAIER ET AL  3,408,850
TUBE BENDING MANDREL
Filed March 18, 1966  2 Sheets-Sheet 1
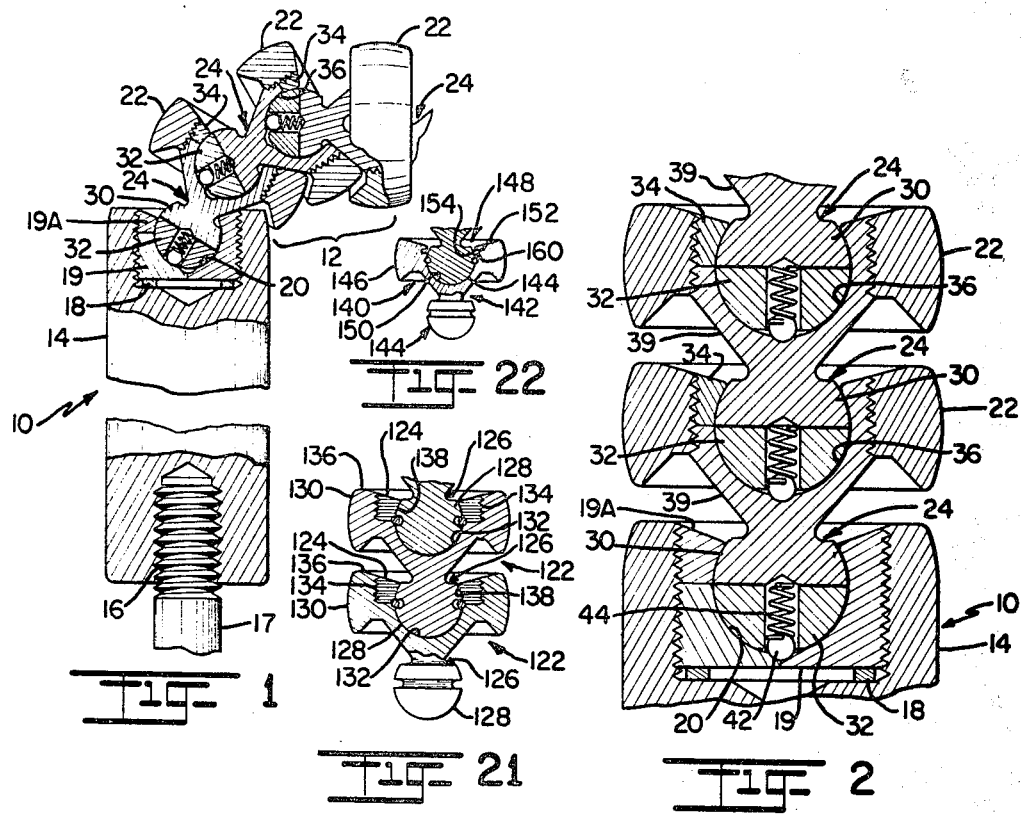
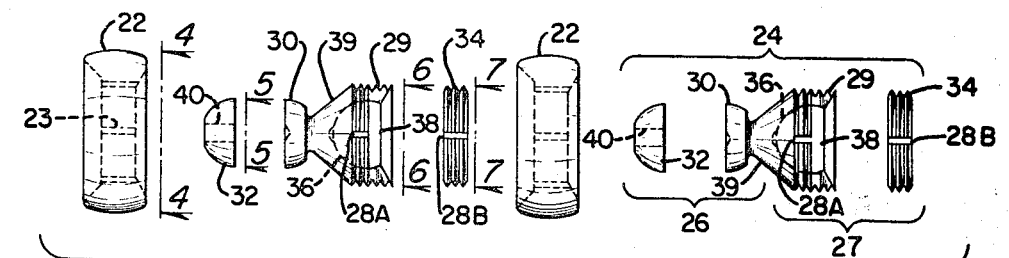
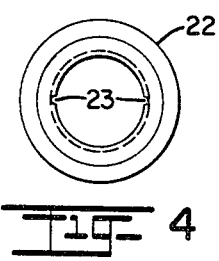
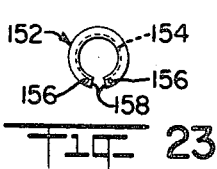
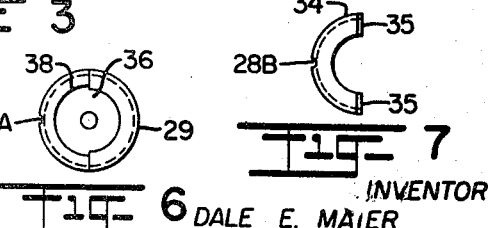
INVENTORS
DALE E. MAIER
FREDERICK A. NELSON
ERVIN V. HOFMAN
RICHARD VAN STELLE
JOSEPH A. CWIK
*Sheridan & Ross*
ATTORNEYS

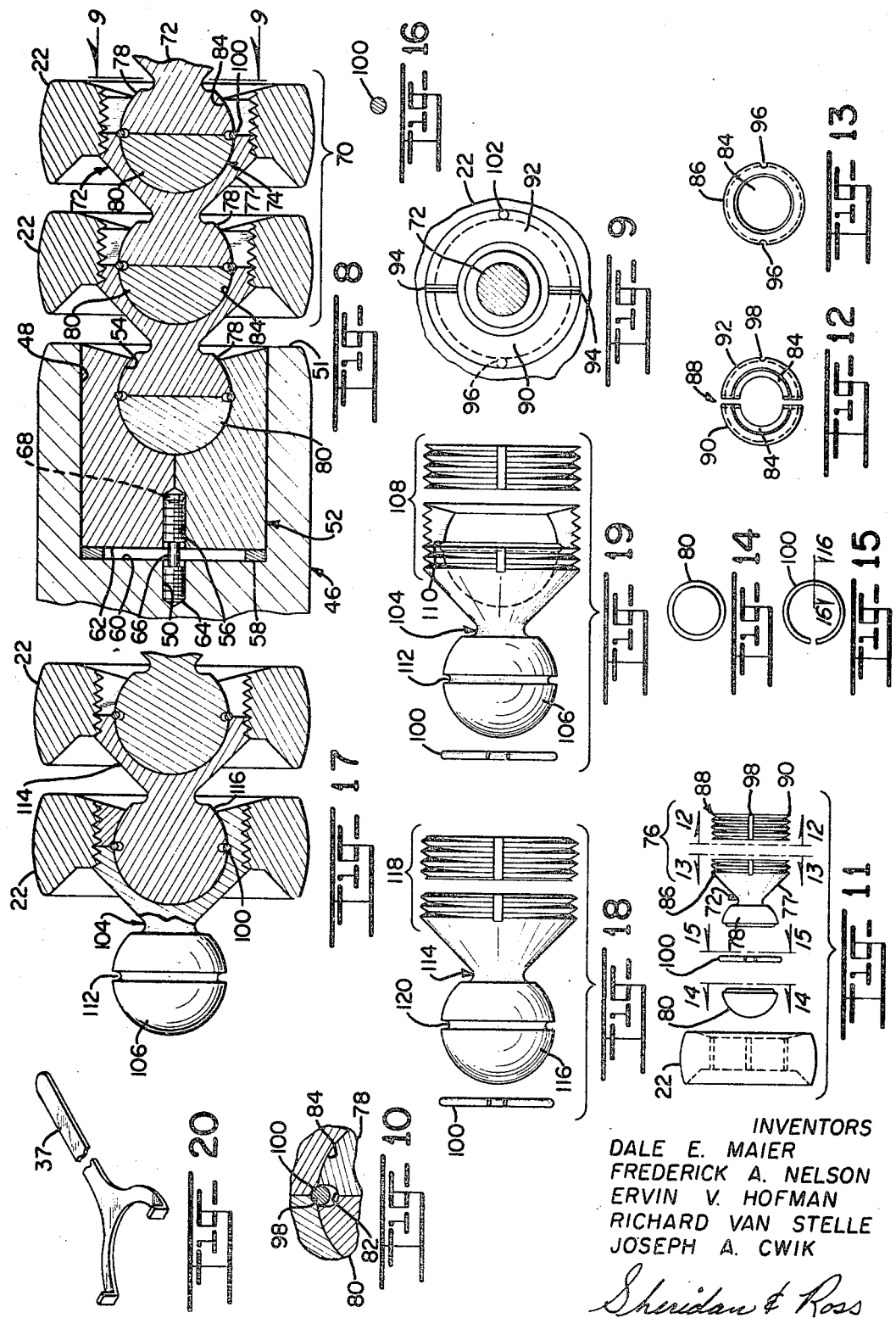

United States Patent Office 3,408,850
Patented Nov. 5, 1968

3,408,850
TUBE BENDING MANDREL
Dale E. Maier, Evergreen, Frederick A. Nelson, Littleton, Ervin V. Hofman, Englewood, Richard Van Stelle, Denver, and Joseph A. Cwik, Arvada, Colo., assignors to H & H Engineering Company, Denver, Colo., a corporation of Colorado
Filed Mar. 18, 1966, Ser. No. 535,504
21 Claims. (Cl. 72—466)

ABSTRACT OF THE DISCLOSURE

A tube bending mandrel including a series of internally threaded outer members constructed for engaging the inner surface of a tube to be bent and a series of inner link members connected together in end to end relation. The inner link members have a spherically shaped male portion formed on one end thereof and a segmented, externally threaded female portion formed on the other end thereof. The female portion has a major portion of a spherically shaped recess formed therein and includes two longitudinally extending, generally cylindrically shaped portions one of which has a spherically shaped recess formed therein and the other of which is segmented and has an inner surface circumscribing the major portion of a spherically shaped cavity. The cylindrically shaped portions have opposed end surface portions disposed in abutting engagement and lie within a plane which substantially bisects said spherically shaped recess and is disposed substantially perpendicular to the longitudinal axis of the female portion. The female portion is sized for threaded disposition within a corresponding one of the outer members and the male portion is sized for swivel disposition within the spherically shaped recess of the female portion of adjacent inner link member. This invention also relates to a tube bending mandrel comprising a series of links swivelly interconnected in end to end relation wherein each link which interconnects one link to another link comprises a member having a spherically shaped male portion formed on one end thereof and an integrally connected, enlarged portion on the other end thereof, said enlarged portion having a surface portion constructed for engaging the inner surface of a tube to be bent, said enlarged portion having a recess formed therein at least a portion thereof including a semispherically shaped recess, and means for swivelly securing the male portion of an adjacent link within said semipherically shaped recess.

This invention relates generally to a novel and improved flexible mandrel for use in bending tubular members and more particularly to a novel mandrel including outer ball members and inner ball-link members connected together in end to end relation in which each inner ball-link member comprises a spherically shaped male portion formed at one end thereof and a segmented female portion formed at the other end thereof, said female portion having a major portion of a spherically shaped recess formed therein.

In the bending of tubular members and related objects, there have been developed in the art numerous devices for preventing the deformation of the tube which has heretofore been an inevitable result of the bending process. Many of these devices have made substantial improvements in the art. However, prior art devices have been expensive and complex in structure and have required special tools and skills in the assembly and disassembly thereof. Further, prior art devices have exhibited inherent weaknesses and failures in the ball-link segments which were due to poorly constructed flange type blocks that were used to secure the inner ball-link members in the outer ball members. Consequently, the use of many prior are devices has been limited by or the expense has been materially increased as a result of the complexity involved in assemblying and disassemblying same as well as in attempting to overcome the inherent weaknesses thereof. It has been discovered, however, that a tube bending mandrel of great simplicity may be constructed through the use of a series of outer ball members and a series of inner ball-link members which are connected together in end to end relation wherein the structure of the inner ball-ink member includes a spherically shaped male portion formed on one end thereof and a segmented female portion formed at the other end thereof, said female portion having a major portion of a spherically shaped recess formed therein, said female portion including two externally threaded, longitudinally extending parts the inner surfaces of which cooperate to circumscribe said major portion of said spherically shaped recess, said parts having opposed end surface portions disposed in abutting engagement and lying within a plane which substantially bisects said spherically shaped recess and is disposed substantially perpendicular to the longitudinal axis of said female portion. It has also been found that risk of injury to the various parts of a mandrel may, for all practical purposes, be eliminated through the use of a stud member to interconnect the mandrel body and the mandrel link, said stud member having a reduced diameter portion disposed intermediate a portion of said mandrel body and a portion of said mandrel link.

Accordingly, one of the principal objects of this invention is to provide a stronger, more practical mandrel and linkage therefore which admits of greater ease in assembly, disassembly, function and manufacture.

Another object of the invention is to provide an easily operated tube bending mandrel characterized by its ease in assembly, high strength and reliability during the employment thereof.

Another object of the present invention is to provide a tube bending mandrel having replaceable sections, the number thereof depending on the length of the tube to be bent.

A further object of this invention is to provide a tube bending mandrel of the link type which is capable of both flexing in any desired direction and of being easily changed to a required length.

Another object of this invention is to provide a tube bending mandrel of the link type which may be easily assembled and disassembled without the use of expensive tools and the like.

Another object of this invention is to provide a tube bending mandrel including a series of outer, internally threaded ball members and a series of inner ball-link member connected together in end to end relation; each ball-link member having a spherically shaped male portion formed at one end thereof a segmented female portion formed at the other end thereof, said female portion having a major portion of a spherically shaped recess formed therein, said female portion including two externally threaded, longitudinally extending parts the inner surfaces of which cooperate to circumscribe the major portion of said spherically shaped recess, said parts having opposed end surface portions disposed in abutting engagement and lying within a plane which substantially bisects said spherically shaped recess and which is disposed substantially perpendicular to the longitudinal axis of said female portion, said female portion being sized for threaded disposition within a corresponding one of said outer ball members and said male portion being sized for swivel disposition within the spherically shaped recess of the female portion of an adjacent inner ball-link member.

Another object of this invention is to provide an improved mandrel having a mandrel body and a segmented mandrel link interconnected by a stud member having a reduced diameter portion disposed intermediate a portion of said mandrel body and a portion of said mandrel link.

The above and other objects of the present invention will become more readily understood from the following detailed description taken together with the accompanying drawings in which:

FIGURE 1 is a side elevation and partially sectional view of one embodiment of a mandrel which is constructed in accordance with the present invention;

FIGURE 2 is an enlarged sectional view of the mandrel shown in FIGURE 1;

FIGURE 3 is an enlarged, exploded view of the various parts of a pair of outer ball members and inner ball members;

FIGURE 4 is an end view taken along the line 4—4 of FIGURE 3;

FIGURE 5 is a view taken along the line 5—5 of FIGURE 3;

FIGURE 6 is a view taken along the line 6—6 of FIGURE 3;

FIGURE 7 is a view taken along the line 7—7 of FIGURE 3;

FIGURE 8 is an enlarged sectional view of another embodiment of a mandrel constructed in accordance with the present invention;

FIGURE 9 is an end elevational view taken along line 9—9 of FIGURE 8;

FIGURE 10 is an enlarged view showing the positioning of a detent disposed within an annular groove defined by the inner and outer surfaces, respectively, of said female portion and said male portion;

FIGURE 11 is an exploded view of the various parts of a detent assembly, an inner ball-link member and an outer ball member shown in FIGURE 8;

FIGURE 12 is a view taken along line 12—12 of FIGURE 11;

FIGURE 13 is a view taken along line 13—13 of FIGURE 11;

FIGURE 14 is a view taken along line 14—14 of FIGURE 11;

FIGURE 15 is a view taken along line 15—15 of FIGURE 11;

FIGURE 16 is a cross-sectional view taken along line 16—16 of FIGURE 15;

FIGURE 17 is an enlarged sectional view of a portion of a mandrel constructed in accordance with the subject invention comprising an inner ball-link member having a grooved male portion;

FIGURE 18 is an exploded view of a detent assembly and the left hand inner ball-link member shown in FIGURE 17;

FIGURE 19 is an exploded view of a detent assembly and the middle inner ball-link member shown in FIGURE 17;

FIGURE 20 is a perspective view of a spanner-type wrench useful in assemblying and disassembling tube mandrels constructed in accordance with the subject invention;

FIGURE 21 is a cross-sectional view of another embodiment of a mandrel of the present invention;

FIGURE 22 is a cross-sectional view of another embodiment of a mandrel of the present invention; and FIGURE 23 is an elevational view of the concavely shaped annular member or split ring shown in FIGURE 22.

Referring now to the drawings, in FIGURES 1 and 2 is shown one embodiment of a tube bending mandrel constructed in accordance with the subject invention comprising a straight, non-flexible portion including the mandrel body 10 and a flexible portion indicated generally as 12. The purpose of the non-flexible portion is to provide a base of connection for the flexible portion 12 of the mandrel and serve as the necessary media for supplying the proper radius as the tube begins to draw form. It will be seen that the mandrel body 10 comprises a shank 14 having one end internally threaded at 16 and in which is disposed a tension and extraction bar 17. The opposite end of the shank 14 is internally threaded and has a lock washer 18 and a segmented mandrel link 19 disposed therein, said lock washer 18 being disposed intermediate a portion of said shank 14 and a portion of said mandrel link 19. The segmented mandrel link 19 has the major portion of a spherically shaped recess 20 formed in one end thereof. The purpose of the lock washer 18 is to increase substantially the frictional force being applied between the threads formed on the external surface of the segmented mandrel 19 and the mating threads formed on the ends of mandrel link 14. The segmented mandrel link 19 serves as a connecting means between the mandrel body 10 and the flexible portion 12.

The improved flexible portion 12 of the mandrel to be presently described includes a series of internally threaded, outer ball members 22 and a series of inner ball-link members 24 which are adapted to interconnect along with the cooperating outer ball members 22 to provide a rotary and unidirectional flexible arrangement. Each ball member 22 has one or more longitudinally extending grooves 23 formed in the threaded portion thereof, see FIGURES 3 and 4.

The inner ball-link members 24 are shown best in FIGURES 3 and 5–7 and include a segmented, spherically shaped male portion 26 and a segmented, externally threaded female portion 27. It will be noted that the segmented male portion comprises a semispherically shaped member 30 formed on one end of the inner ball-link member 24 and a separate semispherically shaped member 32 adapted to cooperate with semispherically shaped member 30 to form the greater portion of a spherically shaped member all as shown in FIGURE 3. The use of two semispherical members cooperating to form a split ball facilitates the assembly and disassembly of the several links in the flexible portion 12 of the mandrel.

The female portion 27 of the inner ball-link member includes the part that is integrally connected to the end of semispherically shaped portion 30 and ring-like segment 34. Female portion 27 is externally threaded and has a longitudinally extending groove comprising portions 28A and 28B formed in the threaded portion thereof. Female portion 27 includes an annular, cylindrically shaped structure or body having an integrally connected, externally threaded, ring-like segment 29 extending longitudinally from the end thereof. The maximum circumferential extent of said segment 29 is 180°. Segment 29 is formed partially surrounding the lip of recess 36 formed in the cylindrically shaped part of the female portion 28. As described, the second independent female portion 34 is an externally threaded, ring-like segment, see FIGURE 7. Female portion 34 has a pair of coaligned, diametrically disposed, recess portions 35 formed across one end thereof for the purpose of receiving a tool such as a spanner wrench 37 shown in FIGURE 20. Female portion 34 cooperates with the previously described ring-like segment 29 to form an externally threaded completely annular, cylindrically shaped female portion which surrounds and defines a part of the recess 36. The two female portions 29 and 34 are adapted to be threadably mounted within a corresponding outer ball member and are thus held firmly against radial expansion as a result thereof. Such mounting also effectively secures the segmented male portion flexibly within said recess 36. It will be noted that the spherically shaped recess 20 formed in the mandrel link 19 resembles and serves a similar purpose as does the spherically shaped recess 36. More specifically, the mandrel link 19 includes a ring-like segment 19A similar to female portion 34 and which cooperates with the remaining portion of the mandrel link to secure the male portion 26 of an inner ball-link member within the recess 20 and provide a strong flexible connection between the shank 14 and the flexible portion 12 of the mandrel. Although not shown, one end of ring-like segment 19A has a pair of coaligned, diametrically disposed recess portions formed therein for receiving a tool such as a spanner wrench 37.

The spherically shaped recess 36 is designed to receive both the independent semispherically shaped member 32 and the cooperating semispherically shaped portion 30 of the inner ball-link member 24. Thus, it is readily apparent that in effect a ball and socket arrangement is created. Since the said recess 36 has a limited mouth area 38, the split ball of an adjacent inner ball-link is secured therein whenever the two female portions 29 and 34 are threadably positioned in outer ball member 22 while at the same time an adequate flexible movement of the said split ball is permitted within the said recess 36. Thus, it is seen that this linking arrangement serves to interconnect the flexible links in a spaced relationship and at the same time provides for a high degree of flexibility between the said links. Such degree of flexibility is achieved in part through the use of a frustum portion 39 disposed intermediate the semispherically shaped male portion 30 and the female portion 27 in which the diameter thereof decreases in a direction proceeding from the female portion to the male portion 30.

It will be noted that the segmented male portion 26 and in particular the independent semispherical portion 32 thereof preferably has a radially extending bore 40 formed therein for receiving a detent assembly comprising a ball 42 and a spring 44. The detent assembly serves to hold the flexible portion 12 in a relatively stiff, straight relation in alignment with the mandrel body so as to permit fast loading of the links and to prevent them from unduly wobbling and flopping around during assembly and during loading of the tubing onto the balls and mandrel prior to bending.

The securing together of one inner ball-link member to another one is now described. The portion of the inner ball-link member including semispherically shaped portion 30 and the attached ring-like segment 29 is preferably partially threaded into an outer ball member 22. Then, the semispherically shaped portion 32 of adjacent ball-link member 24 is positioned within a part of the recess 36. The ball 42 and spring 44 of the detent assembly are then positioned within the bore 40 of said semispherically shaped portion 32. Then, semispherically shaped portion 30 of said adjacent ball-link member 24 is disposed within the remaining part of the recess 36. Thence, the ring-like segment 34 is disposed within and fills the mouth area 38. Finally, the entire assembly is completely threaded within the outer ball member 22 such as through the use of a spanner wrench 37, and the longitudinally extending groove portions 28A and 28B are aligned with one of the longitudinally extending grooves 23. Then, a pin means (not shown) is inserted within said aligned grooves thereby insuring interlocking engagement between the externally threaded female structure 27 and the internally threaded outer ball member 22. Each successive ball-link member is likewise assembled and secured within a corresponding outer ball member 22.

Referring now to FIGURES 8–16, another embodiment of a mandrel constructed in accordance with the subject invention is now described. In FIGURE 8, the non-flexible portion of the mandrel includes a mandrel body 46 having a first, cylindrically shaped recess 48 and a second, cylindrically shaped recess 50 formed in one end 51 thereof. Said first recess 48 is disposed adjacent said end 51 of said mandrel body 46. Said second recess 50 is internally threaded and is of reduced diameter as compared with said first recess 48 and is disposed in communication with said first recess 48. A segmented mandrel link 52 having the major portion of a spherically shaped recess 54 formed in one end thereof and an internally threaded recess 56 formed in the other end thereof is mounted within the first recess 48. A lock washer 58 is mounted between a radially extending surface portion 60 forming the bottom wall of said recess 48 and an opposed end surface 62 of said segmented mandrel link 52. The lock washer 58 serves the same purpose as lock washer 18 shown and described in connection with FIGURES 1 and 2. An externally threaded stud 64 is shown disposed within internally threaded recesses 50 and 56. Said stud 64 has a reduced diameter portion 66 disposed substantially intermediate said second recess 50 and said recess 56. Said stud 64 also has a tool receiving portion 68 formed on one end thereof for the purpose of facilitating threading of said stud 64 into and out of said second recess 50. Stud 64 with its reduced diameter portion 66 serves a dual function of providing a means for interconnecting the mandrel link 52 with the mandrel 46 and, by means of the reduced diameter portion 66, to promote breakage at a predetermined tensile load thereby minimizing damage to the mandrel and costly down time normally experienced where convenional mandrels are exposed to excessive tensile loading.

Referring now to the flexible portion 70 of the mandrel shown in FIGURE 8, said flexible portion includes internally threaded, outer ball members 22 and inner ball-link members 72. Each ball-link member 72 comprises a spherically shaped male portion 74 and a segmented, externally threaded female portion 76 (see FIGURE 11) interconnected by a frustum portion 77. The male portion 74 is segmented and comprises semispherically shaped member 78 formed on one end of the inner ball-link member 72 and a separate semispherically shaped member 80 adapted to cooperate with semispherically shaped member 78 to form the greater portion of a spherically shaped male portion, see FIGURE 11. The opposed surfaces of the spherical male portion 74 are disposed in abutting engagement along a diametral plane which is disposed substantially perpendicular to the longitudinal axis of the inner ball-link member 72. Said spherically shaped male portion 74 has a peripheral groove 82 (see FIGURE 10) formed on the outer surface thereof and lying within a diametral plane which is also disposed substantially perpendicular to the longitudinal axis of the inner ball-link member 72.

The female portion 76 of each inner ball-link member 72 comprises a segmented, externally threaded cylindrically shaped portion having the major portion of a spherically shaped recess 84 formed therein. Said female portion 76 includes a pair of externally threaded, annular portions 86 and 88, see FIGURES 11–13. Annular portion 86 is integrally attached with semispherically shaped portion 78. Annular portion 88 comprises at least two ring-like segments 90 and 92, the maximum circumferential extent of each being limited to 180°, see FIGURE 12. Ring-like segments 90 and 92 cooperate to circumscribe the major portion of a semispherically shaped recess. Said ring-like segments 90 and 92 also cooperate to form on one end thereof a pair of diametrically disposed recess portions 94 (see FIGURE 9) in which may be inserted the appropriate portion of a tool such as a spanner wrench 37.

Annular portion 86 has a pair of diametrically disposed, longitudinally extending grooves 96 (see FIGURE 13) formed in the threaded portion thereof. Annular portion 88 has a longitudinally extending groove 98 formed in the threaded portion thereof, see FIGURES 11 and 12. Annular portions 86 and 88 of the female portion 76 cooperate to define a peripheral groove 98 (see FIGURE 10) formed on the inner surface thereof the diameter of which is slightly greater than the diameter of the spherically shaped recess 84 formed therein. A detent assembly including an open loop member 100 is disposed within the annular cavity defined by cooperating grooves 82 and 98, see FIGURE 10. The open loop member 100 is formed from a rod-like member having a substantially circular cross-section as shown in FIGURE 16. The peripheral groove 98 comprises, in cross-section, the major portion of a semicircular configuration the radius of which is substantially equal to the radius of the rod-like member used to form the open-loop member 100.

The assembly of the mandrel shown in FIGURE 8 is now described. The stud 64 is threaded into said second recess 50. A lock washer 58 is disposed against surface 60 of said recess 48. The detent assembly comprising member 100 is positioned between the opposed surfaces of semispherically shaped member 78 and 80 and thus lies within peripheral groove 82. The assembled member 100 and semispherically shaped members 78 and 80 are positioned within the spherically shaped recess 54 of the mandrel link 52. The assembled mandrel link, detent assembly and male portion of the inner ball-link member is then inserted within the first recess 48 of the mandrel body 46. Through the use of a suitable tool such as a spanner wrench 37, the assembled mandrel link, detent assembly and male portion of the inner ball-link member 72 is threaded upon the end of the stud 64. Next, an outer ball member 22 is threaded upon annular portion 86 of said inner ball-link member 72. Then, semispherically shaped member 80 of an adjacent ball-link member 72 is disposed within a spherically shaped recess 84. Likewise, an open lock member 100 and semispherically shaped member 78 of said adjacent ball-link member 72 is also disposed within semispherically shaped recess 84. Then, ring-like segments 90 and 92 of the first inner ball-link member 72 is mounted for threaded disposition within the first outer ball member 22. Said portions 90 and 92 are threaded within outer ball member 22 through the use of a suitable tool such as a spanner wrench 37 which has the appropriate portions thereof for insertion within aligned recesses 94. The longitudinally extending groove 98 of annular member 88 is aligned with one of the longitudinally extending grooves 96 of annular member 86. A pin means 102, see FIGURE 9, is then inserted within the aligned grooves 96 and 98 thereby firmly interlocking the threaded portion of the outer ball member 22. Each successive inner ball-link member 72 is likewise assembled and secured within a corresponding outer ball member 22.

The purpose of using a stud 64 having a reduced diameter portion 66 is to minimize damage to the various parts of the mandrel when same has been subjected to an excessive tensile force since the stud 64 will separate at the reduced diameter portion 66 before the remaining parts will be damaged by the application of an excessive amount of force.

Referring now to FIGURES 17–19, in these figures are shown additional embodiments of inner ball-link members constructed in accordance with the subject invention. The inner ball-link member 104 shown in the left end of FIGURE 17 and in FIGURE 19 comprises an integrally formed, peripherally grooved male portion 106 and a segmented female portion 108 which is similar in construction to the segmented female portion structure 27 of the inner ball-link member 24 shown in FIGURE 3 except that the female portion 108 includes a peripheral groove 110 formed on the inner surface thereof much in the same manner as the peripheral groove 98 of the female portion 76 of the inner ball-link member 72, see FIGURE 10. A detent assembly comprising an open loop member 100 is disposed within the cavity formed by the peripheral groove 110 in the female portion 108 and the peripheral groove 112 formed on the outer surface of the male portion 106.

The inner ball-link member 114 shown in the middle of FIGURE 17 and in FIGURE 18 includes an integrally formed, peripherally grooved male portion 116 and a female portion 118 which is substantially similar to the female portion 76 of the inner ball-link member 72 shown in FIGURES 8 and 11. The male portion 116 is substantially similar to the male portion 106 of the inner ball-link member 104 of the FIGURES 17 and 19. A detent assembly including an open loop member 100 is disposed within the peripheral groove 120 formed in the outer surface of the male portion 116.

The outer diameter of the open loop member 100, in its compressed condition, must be not greater and preferably smaller than the diameter of the male portion about which same is mounted. The diameter of the peripheral groove formed on the inner surface of the female portions of the inner ball-link members, such as peripheral grooves 98 (FIGURE 10) and 110 (FIGURE 19), is equal to the diameter of the male portion of said inner ball-link member plus an amount at least slightly less than the diameter of the rod-like member used to form the open loop member 100. It will be understood that the diameter of the peripheral groove formed in the outer surface of the male portions, such as peripheral grooves 82, 112 and 120, will not be greater than the inner diameter of the open loop member 100 in its compressed condition.

Referring now to FIGURE 21, another embodiment of a mandrel constructed in accordance with the subject invention is disclosed therein. The links 122 are swivelly interconnected in end to end relation and comprise an externally threaded, annular member 124 and a member 126 having a spherically shaped male portion 128 formed on one end thereof and an integrally connected, spherically shaped portion 130 formed on the other end thereof. The spherically shaped portion 130 has a recess formed therein comprising a semispherically shaped recess portion 132 disposed in communication with an internally threaded, cylindrically shaped recess portion 134. The cylindrical shaped recess portion 134 is disposed intermediate one end 136 of the spherically shaped portion 130 and said semispherically shaped recess portion 132. Annular member 124 has the major portion of a semispherically shaped recess 138 formed therein. When said annular member 124 is threadedly mounted within said cylindrical shaped recess portion 134, the semispherically shaped recesses 138 and 132, respectively, of said annular member 124 and said spherically shaped portion 130 cooperate to form a cavity the surfaces of which circumscribe the major portion of a spherically shaped recess. As shown, the spherically shaped male portion 128 of one link is swivelly disposed within the cavity of an adjacent link.

The annular member 124 shown in FIGURE 21 is similar in construction to annular portion 88 shown in FIGURES 11 and 12. Annular member 124 includes peripheral grooves (not shown) similar to peripheral grooves 98 as shown in FIGURES 11 and 12. Likewise, the internally threaded cylindrical shaped recess 134 has cooperating peripheral grooves (not shown) formed therein similar to peripheral grooves 96 as shown in FIGURE 13.

The spherically shaped male portion 128 is similar to the male portion 116 of the inner-ball link member shown in FIGURE 18. Additionally, the detent assembly shown in FIGURE 21 is similar to the detent assembly shown and described in connection with FIGURES 8, 10 and 17.

Referring now to FIGURES 22 and 23, another embodiment of a mandrel constructed in accordance with the subject invention is disclosed herein. Each link 140 is swivelly interconnected in end to end relation with a adjacent link. Each link 140 comprises a member 142 having a spherically shaped male portion 144 formed on one end thereof and an integrally connected, spherically shaped portion 146 formed on the other end thereof, said spherically shaped portion 146 having a recess 148 formed therein at least a portion thereof including a semispherically shaped recess 150. Each link also includes means for swivelly securing the male portion 144 of an adjacent link within said semispherically shaped recess portion 150. As shown in FIGURES 22 and 23, said means for swivelly securing the male portion of an adjacent link within said semispherically shaped recess portion 150 includes an annular member or split ring 152 preferably formed slightly concave and having an arcuately formed, inner surface 154 the curvature of which conforms to the curvature of the outer surface of the male portion 144. Said split ring 152 also has tool engaging means 156 formed in close proximity to the ends 158 thereof. Said tool engaging means 156, which may comprise either recesses or boss members, permit the contraction of split ring 152 for mounting within and removal from an annular groove 160 formed within the recess 148 and disposed intermediate said semispherically shaped recess 150 and one end of the spherically shaped portion 146.

The spherically shaped male portion 144 is similar to the male portion 116 of the inner-ball link member shown in FIGURE 18. Additionally, the detent assembly as shown in FIGURE 22 is similar to the detent assembly shown and described in connection with FIGURES 8, 10 and 17.

Although the mandrels shown in FIGURES 21 and 22 may be used for large diameter applications, they have been found to have particular advantage for small diameter applications. In view of the description set forth above with respect to the mandrels shown in FIGURES 1, 2, 8 and 17, it is believed that the assembly and operation of the mandrels shown in FIGURES 21 and 22 will be self evident and, thus, further description thereof is not required.

In operation, a mandrel of this invention is fed into the tube to be bent and aligned with its point of tangency in line with the point of tangency of the bend die. After aligning the mandrel, the tube is clamped to the bend die grip area but the mandrel is left free to float unrestricted or subjected to only a minimal pressure to allow draw forming of the tube or the pipe around the mandrel and the ball members thereof. Following the bending process, the mandrel is removed preferably by a hydraulic cylinder. During the extraction operation, the outer ball members of the mandrel iron or smooth out any irregularities occurring in the tubing surfaces as a result of the initial draw forming step.

From the foregoing, it will be readily appreciated that a mandrel greatly simplified in design and inexpensive to manufacture and use has been described. Further, a mandrel as constructed in accordance with this invention permits smoothing out of the tube surfaces both in forward drawing and extraction of the mandrel after the bend has been completed. Such is possible due to the fact that the mandrel radius and its point of radius tangency prevent excessive strain being imposed upon the flexible portion of the mandrel. Also, such a mandrel may be easily and quickly disassembled by an individual of ordinary skills without the use of any expensive equipment or tools.

It is to be understood that this invention is not limited to the exact embodiments of the device as shown since such are merely by way of illustration and not limitation, as various other forms and modifications will be apparent to those skilled in the art and it is therefore intended that the appended claims cover all such changes and modifications. For example, a compound may be used in lieu of pin 102 to interlock the threaded portions.

What we claim is:

1. A tube bending mandrel comprising a series of outer, internally threaded ball members and a series of inner ball-link members connected together in end to end relation; each ball-link member having a spherically shaped, segmented male portion formed at one end thereof and a segmented female portion formed at the other end thereof, said male portion comprising a semispherically shaped part having a substantially planar surface portion disposed in abutting engagement with a substantially planar surface portion of the other said part along a diametral plane of said male portion, said diametral plane being also disposed substantially perpendicular to the longitudinal axis of said inner ball-link member said female portion having a major portion of a spherically shaped recess formed therein, said female portion including two externally threaded, longitudinally extending parts the inner surfaces of which cooperate to circumscribe the major portion of said spherically shaped recess, said parts having opposed end surface portions disposed in abutting engagement and lying within a plane which substantially bisects said spherically shaped recess and is disposed substantially perpendicular to the longitudinal axis of said female portion, said female portion being sized for threaded disposition within a corresponding one of said outer ball members and said male portion being sized for swivel disposition within the spherically shaped recess of the female portion of an adjacent inner ball-link member; and means for interlocking each ball member and its corresponding female portion to prevent relative rotation therebetween.

2. A tube bending mandrel as described in claim 1 including biased detent means disposed between a part of the male portion of said inner ball-link member and a part of the spherically shaped recess of said female portion.

3. A tube bending mandrel as described in claim 2 in which said biased detent means includes an open loop member formed from a rod member having a generally circular cross-section, said member being disposed within an annular cavity defined by peripheral groove portions formed on a part of the outer surface of said male portion and a part of the surface portion of said spherically shaped recess, the portion of the peripheral groove formed on the surface of said spherically shaped recess comprising, in cross-section, the minor portion of a circular configuration the radius of which is slightly less than the radius of said rod member.

4. A tube bending mandrel comprising a series of outer, internally threaded ball members and a series of inner ball-link members connected together in end to end relation; each ball-link member having a spherically shaped male portion formed at one end thereof and a segmented female portion formed at the other end thereof, said female portion having a major portion of a sphericallly shaped recess formed therein, said female portion including two externally threaded, longitudinally extending parts the inner surfaces of which cooperate to circumscribe the major portion of said spherically shaped recess, said parts having opposed end surface portions disposed in abutting engagement and lying within a plane which substantially bisects said spherically shaped recess and is disposed substantially perpendicular to the longitudinal axis of said female portion, said female portion being sized for threaded disposition within a corresponding one of said outer ball members and said male portion being sized for swivel disposition within the spherically shaped recess of the female portion of an adjacent inner ball-link member; means for interlocking each ball member and its corresponding female portion to prevent relative rotation therebetween; an externally threaded stud; a segmented mandrel link, said mandrel link having the major portion of a spherically shaped recess formed in one end thereof and a cylindrically shaped, internally threaded recess formed in the other end thereof; a mandrel body, said mandrel body having first and second recesses formed in one end thereof, said first recess being disposed adjacent said end thereof and said second recess being disposed in communication with said first recess, said second recess being internally threaded and being of reduced diameter as compared to said first recess; said stud being disposed within the internally threaded recess formed in said mandrel link and the second recess formed in said mandrel body, said stud having a reduced diameter portion formed on the part thereof disposed intermediate the recess formed in said mandrel link and said second recess; the male portion of an adjacent inner ball-link member being disposed within the spherically shaped recess of said mandrel link; and means for increasing frictional force between the threads of said stud disposed in mating engagement with the threads of said internally threaded recesses.

5. A tube bending mandrel as described in claim 1 in which said female portion has tool receiving portions formed in the end thereof.

6. A tube bending mandrel comprising a series of outer, internally threaded ball members and a series of inner ball-link members connected together in the end to end relation; each ball-link member having a spherically shaped male portion formed at one end thereof and a segmented female portion formed at the other end thereof, said female portion having a major portion of a spherically shaped recess formed therein, said female portion including two externally threaded longitudinally extending parts the inner surfaces of which cooperate to circumscribe the major portion of said spherically shaped recess, said parts having opposed end surface portions disposed in abutting engagement and lying within a plane which substantially bisects said spherically said recess and is disposed substantially perpendicular to the longitudinal axis of said female portion, said parts of said female portion including at least a pair of externally threaded, ring-like segments the maximum circumference of each being 180 degrees, said female portion being sized for threaded disposition within a corresponding one of said outer ball members and said male portion being sized for swivel disposition within the spherically shaped recess of the female portion of an adjacent inner ball-link member; and means for interlocking each ball member and its corresponding female portion to prevent relative rotation therebetween.

7. A tube bending mandrel as described in claim 6 in which one of said ring-like segments is integrally connected to the male portion of said inner ball-link member.

8. A tube bending mandrel as described in claim 6 in which the male portion of each inner ball-link member is segmented and said mandrel also includes biased detent means disposed between a part of the male portion of said inner ball-link member and a part of the spherically shaped recess of said female portion.

9. A tube bending mandrel comprising a series of outer, internally threaded ball members and a series of inner ball-link members connected together in end to end relation; each ball-link member having a spherically shaped, segmented male portion formed at one end thereof, a segmented female portion formed at the other end thereof, and a frustum portion interconnecting said male portion and said female portion, the diameter of said frustum portion decreasing in a direction proceeding from the female portion to the male portion, said female portion having a major portion of a spherically shaped recess formed therein, said female portion including two externally threaded, longitudinally extending parts the inner surfaces of which cooperate to circumscribe the major portion of said spherically shaped recess, said parts having opposed end surface portions disposed in abutting engagement and lying within a plane which substantially bisects said spherically recess and is disposed substantially perpendicular to the longitudinal axis of said female portion, the parts of said female portion including a pair of complementary, semiannular, externally threaded parts, said female portion being sized for threaded disposition within a corresponding one of said outer ball members and said male portion being sized for swivel disposition within the spherically shaped recess of the female portion of adjacent inner ball-link member; and means for interlocking each ball member and its corresponding female portion to prevent relative rotation therebetween.

10. A tube bending mandrel comprising a series of outer, internally threaded ball members and a series of inner ball-link members connected together in end to end relation; each ball-link member having a spherically shaped male portion formed at one end thereof and a segmented female portion formed at the other end thereof, said female portion having a major portion of a spherically shaped recess formed therein, said female portion including two externally threaded, longitudinally extending, generally cylindrical shaped portions one of which has a semispherically shaped recess formed therein and the other of which is segmented and has an inner surface circumscribing the major portion of the semi-spherically shaped cavity, said cylindrical shaped portions cooperating to circumscribe the major portion of said spherically shaped recess, said cylindrical shaped portions having opposed end surface portions disposed in abutting engagement and lying within a plane which substantially bisects said spherically shaped recess and is disposed substantially perpendicular to the longitudinal axis of said female portion, said female portion being sized for threaded disposition within a corresponding one of said outer ball members and said male portion being sized for swivel disposition within the spherically shaped recess of the female portion of an adjacent inner ball-link member; and means for interlocking each ball member and its corresponding female portion to prevent relative rotation therebetween.

11. A tube bending mandrel as described in claim 9 including biased detent means disposed between a part of the male portion of said inner ball-link member and a part of the spherically shaped recess of said female portion.

12. A tube bending mandrel as described in claim 10 in which the male portion of each inner ball-link member is segmented.

13. A tube bending mandrel as described in claim 10 in which each inner ball-link member has a frustum portion interconnecting said male portion and said female portion, the diameter of said frustum portion decreasing in a direction proceeding from the female portion to the male portion.

14. In a tube bending mandrel including a series of internally threaded outer members constructed for engaging the inner surface of a tube to be bent and a series of inner link members connected together in end to end relation, the improvement comprising a structure of an inner link member having a spherically shaped male portion formed on one end thereof and a segmented, externally threaded, female portion formed on the other end thereof, said female portion having a major portion of a spherically shaped recess formed therein, said female portion including two longitudinally extending, generally cylindrically shaped portions one of which has a semi-spherically shaped recess formed therein and the other which is segmented and has an inner surface circumscribing the major portion of a semi-spherically shaped cavity, the inner surface of said cylindrically shaped portions cooperating to circumscribe a major portion of said spherically shaped recess, said cylindrically shaped portions having opposed end surface portions disposed in abutting engagement and lying within a plane which substantially bisects said spherically shaped recess and is disposed substantially perpendicular to the longitudinal axis of said female portion, said female portion being sized for threaded disposition within a corresponding one of said outer members and said male portion being sized for swivel disposition within the spherically shaped recess of the female portion of an adjacent inner link member.

15. A tube bending mandrel comprising a series of links swivelly interconnected in end to end relation; each link which interconnects one link to another link comprising a member having a spherically shaped male portion formed on one end thereof and an integrally connected, spherically shaped portion formed on the other end thereof, said spherically shaped portion having a recess formed therein at least a portion thereof including a semispherically shaped recess portion; and means for swivelly securing the male portion of an adjacent link within said semispherically shaped recess portion.

16. A tube bending mandrel as described in claim 15 in which said means for swivelly securing the male portion of an adjacent link within said spherically shaped recess includes an annular groove formed within said recess and disposed intermediate said semispherically shaped recess portion and one end of said spherically shaped member portion, and an annular member mounted within said annular groove and having an inner arcuately shaped surface.

17. A tube bending mandrel as described in claim 16 in which said annular member comprises a generally concavely shaped split ring.

18. A tube bending mandrel as described in claim 15 in which said means for swivelly securing the male portion of an adjacent link within said spherically shaped recess includes an internally threaded, cylindrically shaped recess portion formed intermediate said semispherically shaped recess portion and one end of said spherically shaped member, and an externally threaded, annular member threadedly disposed within said internally threaded, cylindrically shaped recess portion, said annular member having the major portion of a semispherically shaped recess formed therein, the semispherically shaped recess portion formed in said annular member and said spherically shaped member cooperating to form a cavity the surfaces of which circumscribe the major portion of a spherically shaped recess, the spherically shaped male portion of an adjacent link being sized for swivel disposition within said cavity.

19. A tube bending mandrel as described in claim 18 including means for interlocking the annular member and the spherical shaped portion to prevent relative rotation therebetween.

20. A tube bending mandrel as described in claim 15 including biased detent means disposed between a part of the spherically shaped male portion of one of said links and the recess of the spherically shaped portion of an adjacent link.

21. A tube bending mandrel comprising a series of links swivelly interconnected in end to end relation; each link which interconnects one link to another link comprising a member having a spherically shaped male portion formed on one end thereof and an integrally connected, enlarged portion having a surface portion constructed for engaging the inner surface of a tube to be bent, said enlarged portion having a recess formed therein at least a portion thereof including a semi-spherically shaped recess portion; and means for swivelly securing the male portion of an adjacent link within said spherically shaped recess portion.

References Cited
UNITED STATES PATENTS

| | | | |
|---|---|---|---|
| 2,962,077 | 11/1960 | Condiff | 72—466 |
| 3,190,106 | 6/1965 | Spates | 72—466 |
| 3,286,503 | 11/1966 | Garrett | 72—466 |

CHARLES W. LANHAM, *Primary Examiner.*

L. A. LARSON, *Assistant Examiner.*